(12) United States Patent
Murphy (10) Patent No.: US 11,461,246 B2
(45) Date of Patent: Oct. 4, 2022

(54) MULTIPLE MEMORY TYPE MEMORY MODULE SYSTEMS AND METHODS

(71) Applicant: MICRON TECHNOLOGY, INC., Boise, ID (US)

(72) Inventor: Richard C. Murphy, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 59 days.

(21) Appl. No.: 17/243,214

(22) Filed: Apr. 28, 2021

(65) Prior Publication Data

US 2021/0248089 A1 Aug. 12, 2021

Related U.S. Application Data

(60) Division of application No. 16/694,459, filed on Nov. 25, 2019, now Pat. No. 11,003,596, which is a continuation of application No. 15/908,167, filed on Feb. 28, 2018, now Pat. No. 10,528,489.

(51) Int. Cl.
*G06F 12/14* (2006.01)
*G06F 9/455* (2018.01)
*G06F 12/0813* (2016.01)

(52) U.S. Cl.
CPC ...... *G06F 12/1433* (2013.01); *G06F 9/45558* (2013.01); *G06F 12/0813* (2013.01);
(Continued)

(58) Field of Classification Search
CPC ....... G06F 2009/45583; G06F 12/0868; G06F 3/0647; G06F 2009/45595; G06F 12/1433;
(Continued)

(56) References Cited

U.S. PATENT DOCUMENTS 8,856,452 B2 * 10/2014 Sun ..................... G06F 12/0862
711/204
9,239,794 B1 1/2016 Merchant
(Continued)

FOREIGN PATENT DOCUMENTS

JP 2006048422 A 2/2006
JP 2006235761 A 9/2006
(Continued)

*Primary Examiner* — David Yi
*Assistant Examiner* — Zubair Ahmed
(74) *Attorney, Agent, or Firm* — Fletcher Yoder, P.C.

(57) ABSTRACT

The present disclosure provides methods, apparatuses, and systems for implementing and operating a memory module, for example, in a computing device that includes a network interface, which is coupled to a network to enable communication with a client device, and processing circuitry, which is coupled to the network interface via a data bus and programmed to perform operations based on user inputs received from the client device. The memory module includes memory devices, which may be non-volatile memory or volatile memory, and a memory controller coupled between the data bus and the of memory devices. The memory controller may be programmed to determine when the processing circuitry is expected to request a data block and control data storage in the memory devices.

20 Claims, 3 Drawing Sheets

(52) U.S. Cl.
CPC ............. *G06F 2009/45583* (2013.01); *G06F 2009/45595* (2013.01)

(58) Field of Classification Search
CPC ............ G06F 12/0813; G06F 12/0862; G06F 2212/283; G06F 3/0649; G06F 2212/7203; G06F 2212/284; G06F 2212/502; G06F 3/0659; G06F 12/0873; G06F 2212/225; G06F 9/45558; G06F 3/0685; G06F 3/0656; G06F 2212/6024; G06F 2212/6026; G06F 3/0611; G06F 12/0238; Y02D 10/00
USPC .................................................. 711/204, 203
See application file for complete search history.

(56) References Cited

U.S. PATENT DOCUMENTS

| | | |
|---|---|---|
| 10,013,267 B1 | 7/2018 | Wagner et al. |
| 2009/0195280 A1 | 8/2009 | Schlegel et al. |
| 2010/0153618 A1 | 6/2010 | Mathieson et al. |
| 2012/0173831 A1 | 7/2012 | Rubio et al. |
| 2012/0198140 A1 | 8/2012 | Karamcheti et al. |
| 2013/0262738 A1 | 10/2013 | Kwon et al. |
| 2014/0136792 A1 | 5/2014 | Frachtenberg |
| 2014/0365732 A1 | 12/2014 | Sivasubramanian et al. |
| 2015/0106582 A1 | 4/2015 | Mai et al. |
| 2015/0309923 A1 | 10/2015 | Iwata et al. |
| 2017/0017575 A1 | 1/2017 | Razin et al. |
| 2017/0091093 A1* | 3/2017 | Wang ..................... G06F 3/065 |
| 2017/0118839 A1 | 4/2017 | Brunschwiler et al. |
| 2017/0371559 A1 | 12/2017 | Higgins et al. |
| 2018/0165214 A1* | 6/2018 | Farmahini Farahani ................... G06F 12/121 |
| 2019/0146716 A1 | 5/2019 | Yang et al. |

FOREIGN PATENT DOCUMENTS

| | | |
|---|---|---|
| JP | 2013191145 A | 9/2013 |
| JP | 2016197330 A | 11/2016 |
| JP | 2017027451 A | 2/2017 |
| KR | 1020150037474 A | 4/2015 |
| KR | 1020150043102 A | 4/2015 |

* cited by examiner

Address Map (40)

| Virtual Adress (44) | Physical Adress (46) |
|---|---|
| 42A | |
| 42B | |
| 42C | |

FIG. 4

Data Access Information (48)

| Block ID (52) | Write Time (54) | Last Access (56) | Access Count (58) |
|---|---|---|---|
| 50A | | | |
| 50B | | | |
| 50C | | | |

MULTIPLE MEMORY TYPE MEMORY MODULE SYSTEMS AND METHODS

CROSS-REFERENCE TO RELATED APPLICATIONS

Under 35 U.S.C. § 120, this application is a divisional of U.S. patent application Ser. No. 16/694,459, which is entitled "MULTIPLE MEMORY TYPE MEMORY MODULE SYSTEMS AND METHODS," filed Nov. 25, 2019, which is a continuation of U.S. patent application Ser. No. 15/908,167, which is entitled "MULTIPLE MEMORY TYPE MEMORY MODULE SYSTEMS AND METHODS," filed Feb. 28, 2018, now U.S. Pat. No. 10,528,489, issued Jan. 7, 2020, and incorporated by reference herein in its entirety for all purposes.

BACKGROUND

The present disclosure generally relates to memory devices and, more particularly, to memory devices implemented on a memory module (e.g., sub-system) to provide multiple different memory types.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, a computing system includes processing circuitry (e.g., one or more processors) and memory, which may store data accessible by the processor. For example, to perform an operation, the processing circuitry may execute corresponding instructions retrieved from memory. In some instances, data input to the operation may also be retrieved from memory. Additionally or alternatively, data output (e.g., resulting) from the operation may be stored in memory, for example, to enable subsequent retrieval.

Often, memory for a computing system may be provided by memory devices (e.g., chips or integrated circuits) implemented on one or more memory modules, such as a dual in-line memory module (DIMM). Moreover, in some instances, memory devices may be implemented using various different memory types. For example, a first memory device may be implemented as dynamic random-access memory (DRAM) on a first memory module and a second memory device may be implemented as flash (e.g., NAND) memory on a second memory module. Although functionally similar from the perspective of a processor, different memory types may provide varying tradeoffs, for example, between data storage density and data transfer speed. As such, implementation of memory types in a computing system may affect operational efficiency and/or implementation associated cost of the computing system.

BRIEF DESCRIPTION OF THE DRAWINGS

Various aspects of this disclosure may be better understood upon reading the following detailed description and upon reference to the drawings in which.

DETAILED DESCRIPTION

Generally, hardware of a computing system includes processing circuitry and memory, for example, implemented using one or more processors and/or one or more memory devices (e.g., chips or integrated circuits). During operation of the computing system, the processing circuitry may perform various operations by executing corresponding instructions, for example, to determine output data by performing operations on input data. To facilitate operation of the computing system, data accessible to the processing circuitry may be stored in a memory device, such that the memory device stores the input data, the output data, data indicating the executable instructions, or any combination thereof.

In some instances, multiple memory devices may be implemented on a memory module, thereby enabling the memory devices to be communicatively coupled to the processing circuitry as a unit. For example, a dual in-line memory module (DIMM) may include a printed circuit board (PCB) and multiple memory devices. In particular, the memory devices may each be disposed on a flat or planar (e.g., front or back) surface of the printed circuit board and selectively coupled to external pins formed along an (e.g., bottom) edge of the printed circuit board.

Additionally, in some instances, memory devices may be implemented using different memory types. For example, a memory device may be implemented as volatile memory, such as dynamic random-access memory (DRAM) or static random-access memory (SRAM). Alternatively, the memory device may be implemented as non-volatile memory, such as flash (e.g., NAND) memory, phase-change memory (e.g., 3D XPoint™) memory, or ferroelectric random access memory (FeRAM). In any case, memory devices generally include an array of memory cells each used to store a data bit (e.g., "0" bit or "1" bit) and, thus, may be functionally similar from the perspective of the processing circuitry even when implemented using different memory types.

However, different memory types may provide varying tradeoffs that affect operational efficiency and/or implementation associated cost of a computing system. For example, volatile memory may provide faster data transfer (e.g., read and/or write) speeds compared to non-volatile memory. Thus, implementing volatile memory devices in the computing system may facilitate improving operational efficiency, for example, by reducing latency of read operations and/or latency of write operations. On the other hand, non-volatile memory may provide higher data storage density compared to volatile memory. Non-volatile memory cells, in contrast to volatile memory, may also maintain their stored value or data bits while in an unpowered state. Thus, implementing non-volatile memory devices in the computing system may facilitate reducing implementation associated cost, for example, by enabling increased memory storage capacity, reduced physical footprint (e.g., size), and persistence in the absence of a constant power supply.

To facilitate improving operational efficiency and/or implementation associated cost of computing systems, the present disclosure provides techniques for implementing and operating memory modules, which include memory devices that utilize different memory types to facilitate leveraging memory type tradeoffs. In some embodiments, a memory module (e.g., sub-system) may be implemented to include volatile memory and non-volatile memory. For example, the memory module may include one or more DRAM memory devices and one or more 3D XPoint™ memory devices.

In this manner, a multiple memory type memory module may leverage the data transfer speed provided by the volatile memory devices as well as the data storage density provided by the non-volatile memory devices. In particular, the non-volatile memory devices may enable the multiple memory type memory module to provide increased memory capacity and/or reduced physical footprint, for example, compared to a volatile memory only memory module. In fact, in some embodiments, this may enable the multiple memory type memory module to retain data even after electrical power is disconnected. Moreover, the volatile memory devices may enable the multiple memory type memory module to provide reduced data transfer latency, for example, compared to a non-volatile memory only memory module.

In some embodiments, a multiple memory type memory module may include a memory controller that controls data storage within the memory module, for example, by controlling whether data is stored in non-volatile memory devices or in volatile memory devices. To facilitate transferring data between memory devices, in some embodiments, the memory controller may include internal buffer memory. For example, the buffer memory may include SRAM, which provides faster data transfers speeds even compared to the volatile (e.g., DRAM) memory devices. Thus, in some embodiments, the memory controller may control whether data is stored in a volatile memory device, a non-volatile memory devices, its internal buffer memory, or any combination thereof. The memory controller may also provide or allow for direct access from a host device to both volatile and non-volatile memory media. This may be in contrast to some NVDIMM solutions or protocols that utilize non-volatile memory exclusively as a backup medium for volatile media (e.g., NVDIMM-N).

To facilitate leveraging the memory type tradeoffs, in some embodiments, the memory controller may predictively control data storage in the memory module. For example, the memory controller may control where data is stored in the memory module based at least in part on when the data is expected to be requested. Since data access is often somewhat repetitive, in some embodiments, the memory controller may predict when data is expected to be subsequently requested based at least in part on previous data access patterns. In other words, the memory controller may predict when data is expected to be requested based at least in part on data access information, which indicates when data was initially written, when data was last accessed, and/or number of times data has been accessed. For example, the memory controller may predict that first data will be accessed shortly (e.g., within a short time period or duration measured in clock cycles or fractions of a second) when a memory access request for second data has been received and data access information indicates that the first data has previously been accessed immediately after the second data.

To facilitate accounting for differences in storage capacity, in some embodiments, the memory controller may control data storage in the memory module based at least in part on whether data is expected to be requested within a first duration threshold. For example, to facilitate leveraging data transfer speed provided by the volatile memory devices, the memory controller may control data storage such that data expected to be requested within the first duration threshold (e.g., "hot" or expected data) is stored in a volatile memory device. In other words, when expected data is stored in a non-volatile memory device, the memory controller may control data storage such that the expected data is transferred from the non-volatile memory device to a volatile memory device. To perform the data transfer, in some embodiments, the memory controller may retrieve the expected data from the non-volatile memory device into its internal buffer memory and store the expected data from its internal buffer memory into the volatile memory device. Thus, when predicted correctly and a corresponding memory access request is actually received (e.g., within the first duration threshold), the expected data block may be retrieved from the volatile memory device.

As described above, in some embodiments, the buffer memory may provide even faster data transfer speeds than the volatile memory devices. Thus, in some embodiments, the memory controller may leverage the data transfer speed of its buffer memory by storing the expected data therein. For example, the memory controller may retain a copy of the expected data in a buffer or buffer memory (e.g., a separate DRAM or SRAM array) when the buffer memory is used to facilitate transfer of the expected data between memory devices.

In some embodiments, the memory controller may control data storage in its buffer memory based at least in part on a second duration threshold. Since storage capacity of the buffer memory may be limited even compared to the volatile memory devices, in some embodiments, the second duration threshold may be set shorter than the first duration threshold. In other words, in such embodiments, data expected to be requested within the second duration threshold may be stored in both a volatile memory device and the buffer memory. Thus, when predicted correctly and a corresponding memory access request is actually received (e.g., within the second duration threshold), the expected data block may be retrieved directly from the buffer memory.

In any case, implementing and operating a multiple memory type memory module in a computing system in this manner may facilitate improving data access speed and, thus, operational efficiency of the computing system, for example, by reducing data access latency. Moreover, implementing and operating a multiple memory type memory module in this manner may facilitate increasing memory available to a computing system. In fact, such technical benefits may enable hardware of a computing system to be centralized and shared by multiple users, for example, via remote computing devices that provide one or more virtual machines (VMs).

Figure 1:
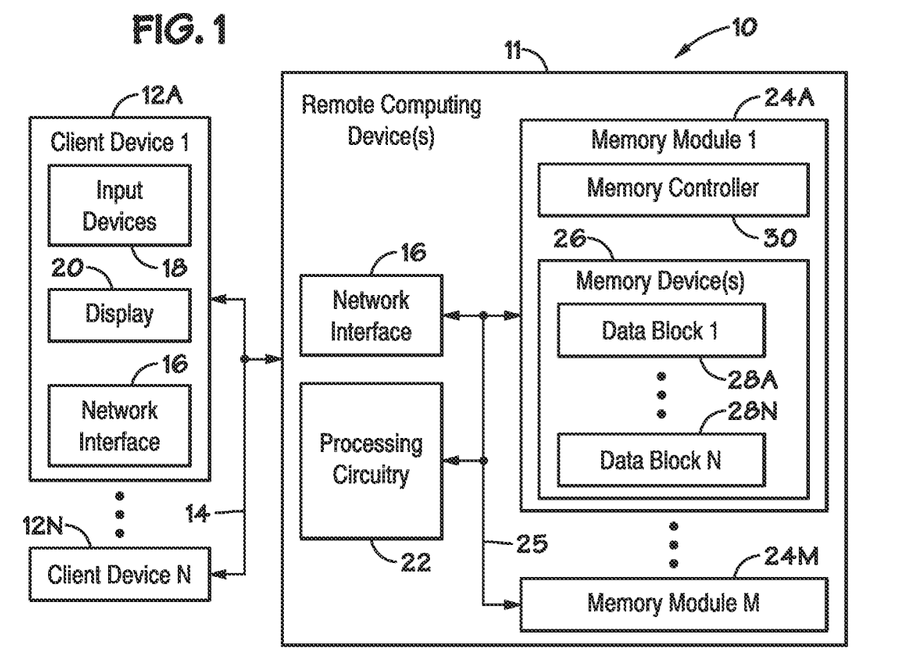
FIG. 1 is a block diagram of a computing system that includes client devices and one or more remote computing devices, in accordance with an embodiment.

To help illustrate, an example of a computing system 10, which includes one or more remote computing devices 11, is shown in FIG. 1. As in the depicted embodiment, the remote computing devices 11 may be communicatively coupled to one or more client device 12 via a communication network 14. It should be appreciated that the depicted embodiment is merely intended to be illustrative and not limiting. For example, in other embodiments, the remote computing devices 11 may be communicatively coupled to a single client device 12 or more than two client devices 12.

In any case, the communication network 14 may enable data communication between the client devices 12 and the remote computing devices 11. In some embodiments, the client devices 12 may be physically remote (e.g., separate) from the remote computing devices 11, for example, such that the remote computing devices 11 are located at a centralized data center. Thus, in some embodiments the communication network 14 may be a wide area network (WAN), such as the Internet. In any case, to facilitate communication via the communication network 14, the remote computing devices 11 and the client devices 12 may each include a network interface 16.

In addition to the network interface 16, a client device 12 may include input devices 18 and/or an electronic display 20, which enable a user to interact with the client device 12. For example, the input devices 18 may receive user inputs and, thus, may include buttons, keyboards, mice, trackpads, and/or the like. Additionally or alternatively, the electronic display 20 may include touch sensing components that receive user inputs by detecting occurrence and/or position of an object touching its screen (e.g., surface of the electronic display 20). In addition to enabling user inputs, the electronic display 20 may facilitate providing visual representations of information by displaying a graphical user interface (GUI) of an operating system, an application interface, text, a still image, video content, or the like.

As described above, the communication network 14 may enable data communication between the remote computing devices 11 and one or more client devices 12. In other words, the communication network 14 may enable user inputs to be communicated from a client device 12 to a remote computing device 11. Additionally or alternatively, the communication network 14 may enable results of operations performed by the remote computing device 11 based on the user inputs to be communicated back to the client device 12, for example, as image data to be displayed on its electronic display 20.

In fact, in some embodiments, data communication provided by the communication network 14 may be leveraged to enable centralizing hardware available to multiple users, for example, such that hardware at client devices 12 may be reduced. For example, the remote computing devices 11 may provide data storage for multiple different client devices 12, thereby enabling data storage (e.g., memory) provided locally at the client devices 12 to be reduced. Additionally or alternatively, the remote computing devices 11 may provide processing for multiple different client devices 12, thereby enabling processing power provided locally at the client devices 12 to be reduced.

Thus, in addition to the network interface 16, the remote computing devices 11 may include processing circuitry 22 and one or more memory modules 24 (e.g., sub-systems) communicatively coupled via a data bus 25. In some embodiments, the processing circuitry 22 and/or the memory modules 24 may be implemented across multiple remote computing devices 11, for example, such that a first remote computing device 11 includes a portion of the processing circuitry 22 and the first memory module 24A while an Mth remote computing device 11 includes another portion of the processing circuitry 22 and the Mth memory module 24M. Additionally or alternatively, the processing circuitry 22 and the memory modules 24 may be implemented in a single remote computing device 11.

In any case, the processing circuitry 22 may generally execute instructions to perform corresponding operations, for example, indicated by user inputs received from a client device 12. Thus, the processing circuitry 22 may include one or more central processing units (CPUs), one or more graphics processing units (GPUs), one or more processor cores, or any combination thereof. In some embodiments, the processing circuitry 22 may additionally perform operations based on circuit connections formed (e.g., programmed) in the processing circuitry 22. Thus, in such embodiments, the processing circuitry 22 may additionally include one or more application specific integrated circuits (ASICs), one or more field programmable logic arrays (FPGAs), or both.

Additionally, a memory module 24 may provide data storage accessible to the processing circuitry 22. For example, a memory module 24 may store data received from a client device 12, data resulting from an operation performed by the processing circuitry 22, data to be input to the operation performed by the processing circuitry 22, instructions executable by the processing circuitry 22 to perform the operation, or any combination thereof. To facilitate providing data storage, a memory module 24 may include one or more memory devices 26 (e.g., chips or integrated circuits). In other words, the memory devices 26 may each be a tangible, non-transitory, computer-readable medium that stores data accessible to the processing circuitry 22.

Since hardware of the remote computing devices 11 may be utilized by multiple client devices 12, at least in some instances, a memory module 24 may store data corresponding with different client device 12. To facilitate identifying appropriate data, in some embodiments, the data may be grouped and stored as data blocks 28. In fact, in some embodiments, data corresponding with each client device 12 may be stored as a separate data block 28. For example, the memory devices 26 in the first memory module 24A may store a first data block 28A corresponding with the first client device 12A and an Nth data block 28N corresponding with the Nth client device 12N.

Additionally, in some embodiments, a data block 28 may correspond to a virtual machine (VM) provided to a client device 12. In other words, as an illustrative example, a remote computing device 11 may provide the first client device 12A a first virtual machine via the first data block 28A and provide the Nth client device 12N an Nth virtual machine via the Nth data block 28N. Thus, when the first client device 12A receives user inputs intended for the first virtual machine, the first client device 12A may communicate the user inputs to the remote computing devices 11 via the communication network 14. Based at least in part on the user inputs, the remote computing device 11 may retrieve the first data block 28A, execute instructions to perform corresponding operations, and communicate the results of the operations back to the first client device 12A via the communication network 14.

Similarly, when the Nth client device 12N receives user inputs intended for the Nth virtual machine, the Nth client device 12B may communicate the user inputs to the remote computing devices 11 via the communication network 14. Based at least in part on the user inputs, the remote computing device 11 may retrieve the Nth data block 28N, execute instructions to perform corresponding operations, and communicate the results of the operations back to the Nth client device 12N via the communication network 14. Thus, the remote computing devices 11 may access (e.g., read and/or write) various data blocks 28 stored in a memory module 24.

To facilitate improving access to stored data blocks 28, a memory module 24 may include a memory controller 30 that controls storage of data in its memory devices 26. In some embodiments, the memory controller 30 may operate based on circuit connections formed (e.g., programmed) in the memory controller 30. Thus, in such embodiments, the memory controller 30 may include one or more application specific integrated circuits (ASICs), one or more field programmable logic arrays (FPGAs), or both. In any case, as described above, a memory module 24 may include memory devices 26 that implement different memory types, for example, which provide varying tradeoffs between data access speed and data storage density. Thus, in such embodiments, the memory controller 30 may control data storage across multiple memory devices 26 to facilitate leveraging the various tradeoffs, for example, such that the memory module 24 provides fast data access speed as well as high data storage capacity.

Figure 2:
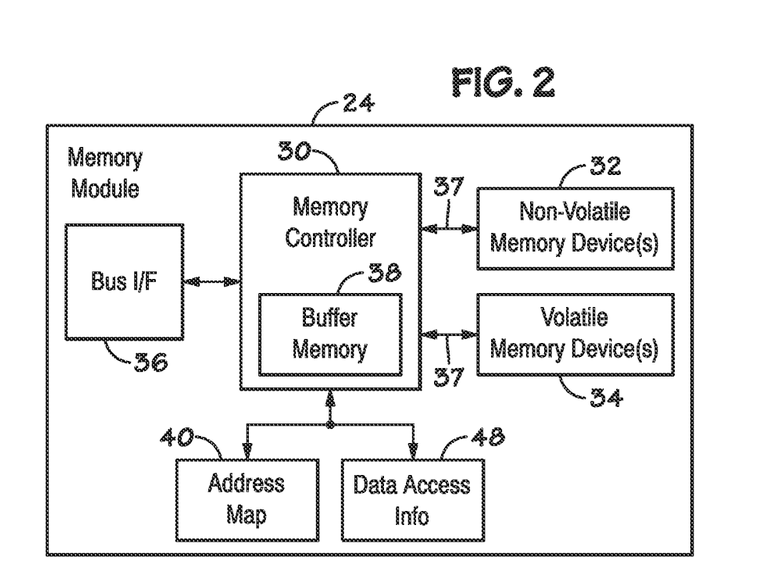
FIG. 2 is a block diagram of a memory module implemented in a remote computing device of FIG. 1, in accordance with an embodiment.

To help illustrate, an example of a memory module 24, which includes memory devices 26 that implement different memory types, is shown in FIG. 2. In particular, the memory module 24 includes one or more non-volatile memory devices 32 and one or more volatile memory devices 34. In some embodiments, the volatile memory devices 34 may be implemented as dynamic random-access memory (DRAM) and/or static random-access memory (SRAM). In other words, in such embodiments, the memory module 24 may include one or more DRAM devices (e.g., chips or integrated circuits), one or more SRAM devices (e.g., chips or integrated circuits), or both.

Additionally, in some embodiments, the non-volatile memory devices 32 may be implemented as flash (e.g., NAND) memory, phase-change (e.g., 3D XPoint™) memory, and/or ferroelectric random access memory (FeRAM). In other words, in such embodiments, the memory module 24 may include one or more NAND memory devices, one or more 3D XPoint™ memory devices, or both. In fact, in some embodiments, the non-volatile memory devices 32 may provide storage class memory (SCM), which, at least in some instance, may facilitate reducing implementation associated cost, for example, by obviating other non-volatile data storage devices in the computing system 10.

In any case, in some embodiments, the memory module 24 may be implemented by disposing each of the non-volatile memory devices 32 and the volatile memory devices 34 on a flat (e.g., front and/or back) surface of a printed circuit board (PCB). To facilitate data communication via the data bus 25, the memory module 24 may include a bus interface 36. For example, the bus interface 36 may include data pins (e.g., contacts) formed along an (e.g., bottom) edge of the printed circuit board. Thus, in some embodiments, the memory module 24 may be a single in-line memory module (SIMM), a dual in-line memory module (DIMM), or the like.

Additionally, in some embodiments, the bus interface 36 may include logic that enables the memory module 24 to communicate via a communication protocol implemented on the data bus 25. For example, the bus interface 36 may control timing of data output from the memory module 24 to the data bus 25 and/or interpret data input to the memory module 24 from the data bus 25 in accordance with the communication protocol. Thus, in some embodiments, the bus interface 36 may be a double data rate fourth-generation (DDR4) interface, a double data rate fifth-generation (DDR5) interface, a peripheral component interconnect express (PCIe) interface, a non-volatile dual in-line memory module (e.g., NVDIMM-P) interface, or the like.

In any case, as described above, a memory controller 30 may control data storage within the memory module 24, for example, to facilitate improving data access speed and/or data storage efficiency by leveraging the various tradeoffs provided by memory types implemented in the memory module 24. Thus, as in the depicted example, the memory controller 30 may be coupled between the bus interface 36 and the memory devices 26 via ones or more internal buses 37, for example, implemented via conductive traces formed on the printed circuit board. For example, the memory controller 30 may control whether a data block 28 is stored in the non-volatile memory devices 32 or in the volatile memory devices 34. In other words, the memory controller 30 may transfer a data block 28 from the non-volatile memory devices 32 into the volatile memory devices 34 or vice versa.

To facilitate data transfers, the memory controller 30 may include buffer memory 38, for example, to provide temporary data storage. In some embodiments, the buffer memory 38 may include static random-access memory (SRAM) and, thus, may provide faster data access speed compared to the volatile memory devices 34 and the non-volatile memory devices 32. The buffer memory 38 may be DRAM or FeRAM in some cases. Additionally, to facilitate accessing stored data blocks 28, the memory module 24 may include an address map 40, for example, stored in the buffer memory 38, a non-volatile memory device 32, a volatile memory device 34, a dedicated address map memory device, or any combination thereof.

The memory module 24 is depicted in FIG. 2 as a single device that comprises various components or submodules. In some examples, however, a remote computing device may include one or several discrete components equivalent to the various devices, modules, and components that make up memory module 24. For instance, a remote computing device may include non-volatile memory, volatile memory, and a controller that are positioned on one or several different chips or substrates. In other words, the features and functions of memory module 24 need not be implemented in a single module to achieve the benefits described herein.

Figure 3:
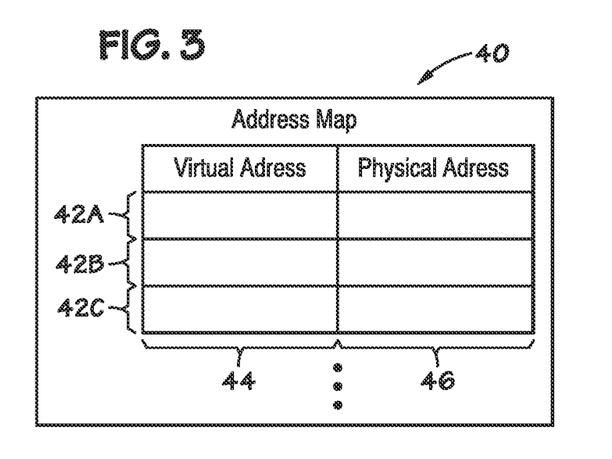
FIG. 3 is a diagrammatic representation of an address map stored in the memory module of FIG. 2, in accordance with an embodiment.

To help illustrate, an example of an address map 40 for a memory module 24 is shown in FIG. 3. As depicted, the address map 40 includes a table with multiple rows 42, a virtual memory address column 44, and a physical memory address column 46. It should be appreciated that the depicted example is merely intended to be illustrative and not limiting. In fact, in some embodiments, the address map 40 may be implemented using multiple tables, for example, organized hierarchically based on where data blocks 28 are stored.

In any case, with regard to the depicted embodiment, each row 42 in the address map 40 may associate a virtual memory address to a corresponding physical memory address. For example, the first row 42A may associate a first virtual memory address and a first physical memory address. Additionally, the second row 42B may associate a second virtual memory address and a second physical memory address. Furthermore, the third row 42C may associate a third virtual memory address and a third physical memory address.

Generally, the physical memory address of a data block 28 may identify actual storage location of the data block 28 in the memory devices 26. Thus, in some embodiments, the physical memory address may be indicative of memory type implemented by a memory device 26 in which the data block 28 is stored. Additionally or alternatively, the address map 40 may explicitly indicate memory type, for example, via another column.

Since actual storage location may change, a data block 28 may be externally identified via its virtual memory address, for example, by the processing circuitry 22. As an illustrative example, when the processing circuitry 22 targets a data block 28 for access, the processing circuitry 22 may communicate a memory access request to the memory module 24, which identifies the target data block 28 via its virtual memory address. Using the address map 40, the memory module 24 may determine a physical memory address associated with the virtual memory address and retrieve the target data block 28 accordingly. In this manner, the address map 40 may facilitate accessing data blocks 28 stored in a memory module 24, for example, by enabling the processing circuitry 22 to continue identifying a data block 28 using the same virtual memory address even after actual storage location of the data block 28 has been changed.

As described above, to facilitate improving data retrieval speed and/or data storage efficiency, storage location of data blocks 28 in a memory module 24 may be controlled based at least in part on memory type implemented in its memory devices 26. For example, with regard to FIG. 2, the memory controller 30 may control storage such that a first data block 28 expected to be accessed within a first duration threshold is stored in the volatile memory devices 34 to leverage the faster data transfer speeds provided by volatile memory. On the other hand, the memory controller 30 may control storage such that a second data block 28 not expected to be accessed within the first duration threshold is stored in the non-volatile memory devices 32 to leverage the greater data storage density provided by non-volatile memory.

In other words, the memory controller 30 may control data storage in the memory module 24 based at least in part on a prediction of when data blocks 28 will actually be accessed. In some embodiments, the memory controller 30 may predict when a data block 28 will be accessed based at least in part on previous access to stored data blocks 28, for example, by memory access requests received from processing circuitry 22. Thus, to facilitate controlling storage of data blocks 28, the memory module 24 may include data access information 48, for example, stored in the buffer memory 38, a non-volatile memory device 32, a volatile memory device 34, a dedicated address map memory device, or any combination thereof.

Figure 4:
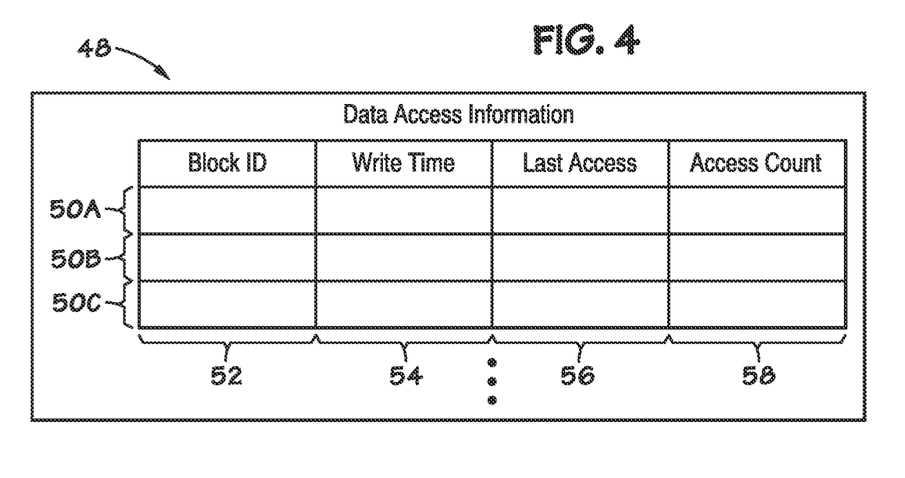
FIG. 4 is a diagrammatic representation of access information stored in the memory module of FIG. 2, in accordance with an embodiment.

To help illustrate, an example of data access information 48 for a memory module 24 is shown in FIG. 4. As depicted, the data access information 48 includes a table with multiple rows 50, a block identifier column 52, a write time column 54, a last accessed column 56, and an access count column 58. It should be appreciated that the depicted example is merely intended to be illustrative and not limiting. In fact, in some embodiments, the data access information 48 may be combined with the address map 40 in one or more tables.

In any case, with regard to the depicted embodiment, each row 50 in the data access information 48 may associate a data block 28 (e.g., identified via its virtual memory address and/or physical memory address) to a write time parameter, a last accessed parameter, and an access count parameter. For example, the first row 50A may associate a first data block 28 with a write time parameter that indicates when the first data block 28 was initially stored in the memory module 24, a last accessed parameter that indicates when the first data block 28 was most recently accessed (e.g., requested), and an access count parameter that indicates the number of times the first data block 28 has previously been accessed.

Additionally, the second row 50B may associate a second data block 28 with a write time parameters parameter that indicates when the second data block 28 was initially stored in the memory module 24, a last accessed parameter that indicates when the second data block 28 was most recently accessed, and an access count parameter that indicates the number of times the second data block 28 has previously been accessed. Furthermore, the third row 50C may associate a third data block 28 with a write time parameter that indicates when the third data block 28 was initially stored in the memory module 24, a last accessed parameter that indicates when the third data block 28 was most recently accessed, and an access count parameter that indicates the number of times the third data block 28 has previously been accessed.

Since data access is often somewhat repetitive, previous data access patterns may be indicative of future data access patterns. For example, to facilitate systematically allocating hardware usage between multiple client devices 12, the remote computing devices 11 may cycle through processing of user inputs received from the various client devices 12 and, thus, access to corresponding data blocks 28 may proceed in a relatively fixed order. Leveraging this repetitive nature, a memory module 24 may operate to predict when stored data blocks 28 will subsequently be accessed based on at least in part on corresponding data access information 48 and adjust data storage within its memory devices 26 accordingly.

Figure 5:
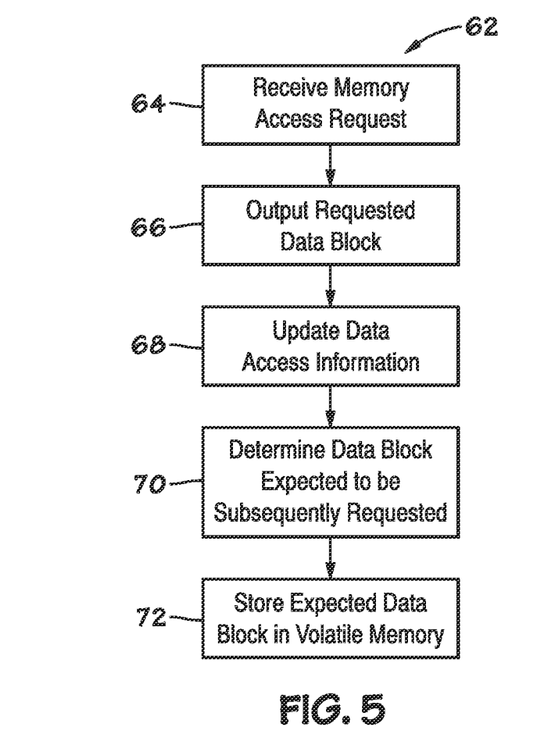
FIG. 5 is a flow diagram of a process for operating the memory module of FIG. 2, in accordance with an embodiment.

To help illustrate, an example of a process 62 for operating a memory module 24 is described in FIG. 5. Generally, the process 62 includes receiving a memory access request (process block 64), outputting a requested data block (process block 66), updating data access information (process block 68), determining a data block expected to be subsequently requested (process block 70), and storing the expected data block in volatile memory (process block 72). In some embodiments, the process 62 may be implemented at least in part by executing instructions stored in a tangible, non-transitory, computer-readable medium, such as a memory device 26, using processing circuitry, such as the memory controller 30. Additionally or alternatively, the process 62 may be implemented at least in part based on circuit connections formed in the memory controller 30.

In any case, as described above, a memory module 24 may receive a request for access to a stored data block 28 via a data bus 25, for example, from processing circuitry 22 (process block 64). In some embodiments, the memory access request may identify the requested data block 28 via its corresponding virtual memory address. As described above, when identified by its virtual memory address, a memory controller 30 may use an address map 40 to determine a corresponding physical memory address, which indicates where the data block 28 is actually stored in the memory module 24. For example, the physical memory address may identify a memory device 26 in the memory module 24 as well as location in the identified memory device 26 at which the data block 28 is stored.

Based at least in part on its physical memory address, the memory controller 30 may retrieve and output the requested data block 28 via the data bus 25, for example, back to the processing circuitry 22 (process block 66). To facilitate improving data transfer speeds, in some embodiments, the memory controller 30 may retrieve the requested data block 28 into its buffer memory 38. For example, when the memory controller 30 determines that the requested data block 28 is stored in a non-volatile memory device 32, the memory controller 30 may retrieve the requested data block 28 into its buffer memory 38. Thus, in some embodiments, the requested data block 28 may be output from the buffer memory 38, for example, instead of directly from a memory device 26 to enable the memory module 24 to leverage the faster data transfer speed provided by the buffer memory 38.

In other embodiments, the requested data block 28 may be retrieved into the buffer memory 38 and output from the memory module 24 relatively in parallel. In any case, as will be described in more detail below, retrieving the requested data block 28 into the buffer memory 38 may facilitate subsequent storage into a volatile memory device 34 and, thus, data retrieval speed provided if the data block 28 is again requested (e.g., within the first duration threshold). In some embodiments, when the memory controller 30 determines that the requested data block 28 is stored in a volatile memory device 34, the memory controller 30 may bypass the buffer memory 38 to enable the requested data block 28 to be output directly from the volatile memory device 34.

In any case, the memory controller 30 may update data access information 48 corresponding with the requested data block 28 (process block 68). For example, the memory controller 30 may update a corresponding last accessed parameter to indicate when the memory access request was received, when the requested data block 28 was retrieved from a memory device 26, and/or when the requested data block 28 was output from the memory module 24. Additionally, the memory controller 30 may increment a corresponding access count parameter.

To facilitate balancing data transfer speed and data storage efficiency provided by the memory module, the memory controller 30 may determine when data blocks 28 are expected to be subsequently requested (process block 70) and control data storage in the memory module 24 accordingly. In some embodiments, to facilitate accounting for prediction accuracy and/or storage capacity of the various memory types, the memory controller 30 may determine when data blocks 28 are expected to be requested relative to one or more duration thresholds. For example, the memory controller 30 may determine when data blocks 28 are expected to be requested relative to a first duration threshold, which is set to account for storage capacity of the volatile memory devices 34.

Additionally, in some embodiments, the memory controller 30 may determine when data blocks 28 are expected to be requested relative to a second duration threshold, which is set to account for storage capacity of its buffer memory 38. Since storage capacity of the buffer memory 38 is generally less than the storage capacity of volatile memory devices 34, in some embodiments, the second duration threshold may be set shorter than and overlapping with the first duration threshold. In other words, when a data block 28 is expected to be requested within the second duration threshold, the memory controller 30 may determine that the data block 28 is also expected to be requested within the first duration threshold.

In any case, in some embodiments, the memory controller 30 may determine when data blocks 28 are expected to be requested based at least in part on corresponding data access information 48. In particular, the memory controller 30 may analyze data access parameters corresponding with one or more data blocks 28 to determine previous data access patterns. Since data access patterns are often somewhat repetitive (e.g., cyclical), the memory controller 30 may predict future data access patterns based at least in part on the previous data access patterns.

In some embodiments, the memory controller 30 may predict data access based at least in part on data access parameters corresponding with multiple different data blocks 28 relative to one another. For example, the memory controller 30 may predict a first duration between memory access requests for a first data block 28 and a second data block 28 based at least in part on the difference between a write time parameter associated with the first data block 28 and a write time parameter associated with the second data block 28. Additionally or alternatively, the memory controller 30 may predict a second duration between memory access request for the first data block 28 and the second data block 28 based at least in part on the difference between a last accessed parameter associated with the first data block 28 and a last access parameter associated with the second data block 28.

Additionally or alternatively, in some embodiments, the memory controller 30 may predict data access based at least in part on data access parameters corresponding with a data block 28 relative to itself. For example, the memory controller 30 may predict a third duration between successive memory access requests for the first data block 28 based at least in part on first a previous request frequency determined based at least in part on the difference between the last accessed parameter and the write time parameter associated with the first data block 28 divided by an access count parameter associated with the first data block 28. Similarly, the memory controller 30 may predict a fourth duration between successive memory access requests for the second data block 28 based at least in part on a second previous request frequency determined based at least in part on the difference between the last accessed parameter and the write time parameter associated with the second data block 28 divided by an access count parameter associated with the second data block 28.

To facilitate improving prediction accuracy, in some embodiments, the memory controller 30 may combine analysis across multiple different data access parameters. For example, the memory controller 30 may predict a fifth duration between memory access request for the first data block 28 and the second data block 28 based on an average of the first duration prediction and the second duration prediction. Additionally or alternatively, the memory controller 30 may predict a sixth duration between successive memory access requests for the second data block 28 by adjusting the fourth duration prediction based on accuracy of the third duration prediction.

By predicting the memory access pattern, the memory controller 30 may predict when data blocks 28 will be requested relative to when the memory access request for the target data block 28 was received. For example, when the received memory access request targets the first data block 28, the memory controller 30 may predict that a memory access request for the second data block 28 will be received within the fifth predicted duration. Additionally or alternatively, when the received memory access request targets the second data block 28, the memory controller 30 may predict that a next memory access request for the second data block 28 will be received within the sixth predicted duration.

It should be appreciated that the described prediction techniques are merely intended to be illustrative and not limiting. In particular, in some embodiments, the memory controller 30 may implement machine learning prediction techniques, for example, that adaptively adjust based at least in part on accuracy of previous predictions. As an illustrative example, when the first data block 28 is requested by the received memory access request and the second data block 28 is expected to be requested after the first data block 28, the memory controller 30 may determine accuracy of the third duration prediction relative to actual duration between the memory access request and a directly previous memory access request for the first data block 28. Based at least in part on the accuracy, the memory controller 30 may weight averaging of the first predicted duration and the second predicted duration, which at least in some instances, may facilitate improving prediction accuracy, for example, by enabling influence of outliers on the prediction to be reduced.

In any case, to facilitate improving data transfer speed provided by the memory module 24, the memory controller 30 may control data storage such that one or more data block 28 expected to be subsequently requested are stored in the volatile memory devices 34 of the memory module 24 (process block 72). For example, when a data block 28 is expected to be requested within the first duration threshold, the memory controller 30 may control data storage such that the data block 28 is stored in a volatile memory device 34 of the memory module 24. Thus, when predicted correctly and access to the expected data block 28 is actually requested (e.g., within the first duration threshold), the memory module 24 may leverage the faster data transfer speed of the volatile memory device 34, for example, compared to the non-volatile memory devices 32 by outputting the data block 28 directly from the volatile memory device 34.

In some embodiments, the memory controller 30 may additionally control data storage such that the one or more data block 28 expected to be subsequently requested are stored in its buffer memory 38. For example, when a data block 28 is expected to be requested within the second duration threshold, the memory controller 30 may control data storage such that the data block 28 is stored in its buffer memory 38. Thus, when predicted correctly and access to the expected data block 28 is actually requested, the memory module 24 may leverage the even faster data transfer speed of the buffer memory 38 by outputting the data block 28 directly from the buffer memory 38. Since storage capacity of the buffer memory 38 is generally limited, in some embodiments, data blocks 28 expected to be subsequently requested may nevertheless be stored in the volatile memory devices 34, for example, to enable freeing the buffer memory 38 for other purposes.

Figure 6:
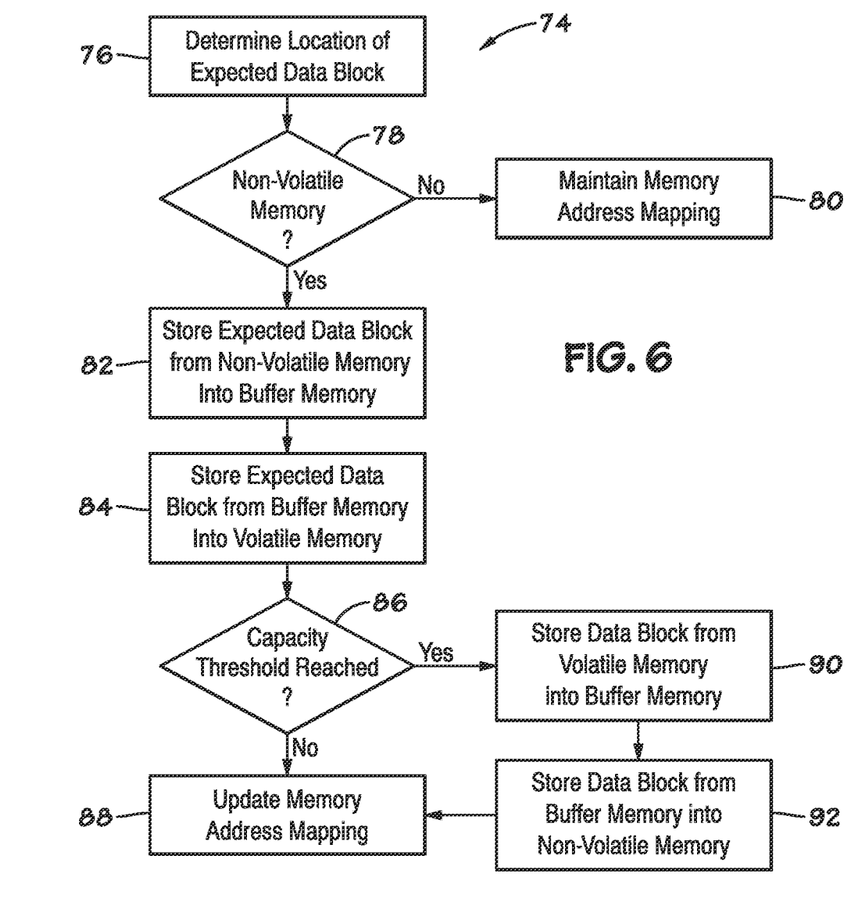
FIG. 6 is a flow diagram of a process for operating the memory module of FIG. 2 to store data expected to be subsequently accessed in volatile memory, in accordance with an embodiment.

An example of a process 74 for storing an expected data block in volatile memory is described in FIG. 6. Generally, the process 74 includes determining location of an expected data block (process block 76), determining whether the expected data block is stored in non-volatile memory (decision block 78), and maintaining memory address mapping when the expected data block is not stored in non-volatile memory (process block 80). When stored in non-volatile memory, the process 74 includes storing the expected data block from non-volatile memory into buffer memory (process block 82), storing the expected data block from the buffer memory into volatile memory (process block 84), determining whether a capacity threshold is reached (decision block 86), and updating the memory address mapping (process block 88). When the capacity threshold is reached, the process 74 includes storing a data block from volatile memory into the buffer memory (process block 90) and storing the data block from the buffer memory into non-volatile memory (process block 92). In some embodiments, the process 74 may be implemented at least in part by executing instructions stored in a tangible, non-transitory, computer-readable medium, such as a memory device 26, using processing circuitry, such as the memory controller 30.

Additionally or alternatively, the process 74 may be implemented at least in part based on circuit connections formed in the memory controller 30.

Accordingly, in some embodiments, a memory controller 30 may determine storage location of a data block expected to be subsequently requested from a corresponding memory module 24 (process block 76). As described above, the actual storage location of a data block 28 may be indicated by its physical memory address, for example, used as a block identifier associated with data access parameters. Additionally, as described above, a physical memory address corresponding with a data block 28 may be indicative of the memory device 26 and, thus, the memory type used to store the data block 28.

In other words, based at least in part on its storage location, the memory controller 30 may determine whether the expected data block is stored in non-volatile memory devices 32 of the memory module 24 (decision block 78). When not stored in any of the non-volatile memory devices 32, the memory controller 30 may determine that the expected data block is already stored in a volatile memory device 34 of the memory module 24. As such, the memory controller 30 may control data storage such that the expected data block 28 remains at the same physical memory address and, thus, maintain a corresponding entry in the address map 40 unchanged (process block 80).

On the other hand, when the expected data block 28 is stored in a non-volatile memory device 32 of the memory module 24, the memory controller 30 may retrieve the expected data block 28 from the non-volatile memory device 32 into its buffer memory 38 (process block 82). In some embodiments, after storing the expected data block in the buffer memory 38, the memory controller 30 may erase the storage location in the non-volatile memory device 32 to facilitate improving data storage efficiency of the memory module 24, for example, by freeing the storage location for other data block 28. In other embodiments, the memory module 24 may nevertheless retain a copy of the expected data block 28 in the non-volatile memory device 32 to facilitate improving data storage reliability, for example, by providing redundancy that facilitates retrieving lost data blocks 28 and/or correcting erroneous data blocks 28.

In any case, the memory controller 30 may store the expected data block from its buffer memory 38 into a volatile memory device 34 of the memory module 24 (process block 84). In some embodiments, the memory controller 30 may nevertheless retain a copy of the expected data block 28 in its buffer memory 38. As described above, when a corresponding memory access request is received (e.g., within the second duration threshold), this may enable the memory module 24 to output directly from the buffer memory 38, thereby leveraging the faster data transfer speed provided by memory type of the buffer memory 38. However, since storage capacity of the buffer memory 38 may be limited, in some embodiments, the memory controller 30 may overwrite the expected data block 28 when storage space in the buffer memory 38 is otherwise needed.

In any case, after the expected data block 28 is stored into volatile memory, the memory controller 30 may determine whether a storage capacity threshold associated with the volatile memory devices 34 of the memory module 24 has been reached (decision block 86). In some embodiments, the storage capacity threshold may be set to reduce likelihood of oversubscribing the volatile memory devices 34 and, thus, set less than the full (e.g., maximum) storage capacity of the volatile memory devices 34. For example, the storage capacity threshold may be set such that, before it is reached, available (e.g., free) storage capacity in the volatile memory devices 34 is sufficient to store a specific number (e.g., one or more) of data blocks 28.

Thus, when storing the expected data block 28 in the volatile memory devices 34 results in the capacity threshold being reached, the memory controller 30 may retrieve one or more data blocks 28 from the volatile memory devices 34 into its buffer memory 38 (process block 90) and store the one or more data blocks 28 from its buffer memory 38 into the volatile memory devices 34 (process block 92). In some embodiments, setting the capacity threshold multiple data blocks 28 less than the full storage capacity may enable the memory controller 30 to opportunistically initiate the data transfer from the volatile memory devices 34 to the non-volatile memory devices 32. In other words, since available storage capacity in the volatile memory devices 34 may be sufficient to store additional data blocks 28 even after the capacity threshold is reached, this may provide the memory controller 30 some margin to take into account various factors, such as operations being performed and/or operational disruption caused by the transfer.

In some embodiments, the memory controller 30 may determine the number of data blocks 28 to transfer from the volatile memory devices 34 to the non-volatile memory devices 32 based at least in part on the amount the capacity threshold has been exceeded. Additionally, in some embodiments, the memory controller 30 may select which data blocks 28 to transfer from the volatile memory devices 34 to the non-volatile memory device 32 based at least in part on when the data blocks 28 are expected to be requested. As described above, in some embodiments, the memory controller 30 may make such determinations based at least in part on corresponding data access information 48.

For example, the memory controller 30 may select one or more data blocks 28 stored in the volatile memory devices 34 that is not expected within the first duration threshold. In other words, when a data block 28 is not expected to be requested within the first duration threshold, the memory controller 30 may control data storage such that the data block 28 is stored in a non-volatile memory device 32 of the memory module 24. Thus, when predicted correctly and the expected data block is not requested during the first duration threshold, the memory module 24 may leverage the greater data storage density provided by the non-volatile memory devices 32 to facilitate improving data storage efficiency of the memory module 24.

In any case, the memory controller 30 may update the address map 40 to reflect any changes made to storage location of data blocks 28 in the memory module 24 (process block 88). For example, when a data block 28 is transferred from the volatile memory devices 34 to a non-volatile memory device 32, the memory controller 30 may update a corresponding entry to associate the virtual memory address of the data block 28 with its new physical memory address in the non-volatile memory device 32. Additionally, when the expected data block 28 is transferred from the non-volatile memory devices 32 to a volatile memory device 34, the memory controller 30 may update a corresponding entry to associate the virtual memory address of the expected data block 28 with its new physical memory address in the volatile memory device 34.

By implementing and/or operating a memory module in this manner, a data block stored in the memory module may continue being identified (e.g., by processing circuitry) using the same virtual memory address while the memory module predictively adjusts data storage to leverage tradeoffs provided by different memory types implemented therein. For example, the memory module may store a data expected to be requested shortly (e.g., within the first duration threshold) in volatile memory to facilitate providing improved data transfer speeds. Additionally or alternatively, the memory module may store data not expected to be requested shortly in non-volatile memory to facilitate providing improved data storage efficiency. With this understanding, the technical effects of the present disclosure include improving operational efficiency and/or reducing implementation associated cost (e.g., physical footprint) of memory modules and, thus, computing systems in which the memory modules are implemented.

One or more specific embodiments of the present disclosure are described above. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An apparatus, comprising:
   a memory module comprising a plurality of memory devices that includes at least a plurality of non-volatile memory devices and a plurality of volatile memory devices; and
   a memory controller communicatively coupled to the memory module, wherein the memory controller is configured to:
     predict whether a first data block will be requested by processing circuitry within a duration threshold, wherein the first data block comprises instructions executable by the processing circuitry to provide a first virtual machine;
     transfer the first data block from the plurality of non-volatile memory devices to the plurality of volatile memory devices when the first data block is stored in the plurality of non-volatile memory devices and when the first data block is predicted to be requested within the duration threshold; and bypass buffer memory implemented in the memory controller when the first data block is actually requested by the processing circuitry within the duration threshold to enable the memory module to output the first data block directly from the plurality of volatile memory devices.

2. The apparatus of claim 1, wherein the prediction of whether the first data block will be requested within the duration threshold comprises a determination of whether the first data block is predicted to be requested within a first duration threshold or outside of the first duration threshold but within a second duration threshold used to trigger reading of respective data blocks from the plurality of volatile memory devices; and wherein the memory controller is configured to:
store the first data block in the buffer memory, the plurality of volatile memory devices, or both in response to the prediction.

3. The apparatus of claim 2, wherein the memory controller is configured to:
store a second data block predicted to be requested within the second duration threshold from the plurality of non-volatile memory devices into the plurality of volatile memory devices;
store a third block not predicted to be requested within the second duration threshold from the plurality of volatile memory devices to the plurality of non-volatile memory devices; or
both.

4. The apparatus of claim 1, wherein the memory controller is configured to predict when the first data block will be requested based at least in part on analysis of data access parameters associated with the first data block using machine learning prediction techniques that adjust predictions based at least in part on accuracy of previous predictions.

5. The apparatus of claim 1, comprising a printed circuit board, wherein the plurality of memory devices is disposed on the printed circuit board wherein some of the plurality of memory devices are disposed on a first planar surface of the printed circuit board and some of the plurality of memory devices are disposed on a second planar surface of the printed circuit board opposite the first planar surface.

6. The apparatus of claim 5, comprising:
a first plurality of data pins formed on the first planar surface along an edge of the printed circuit board; and
a second plurality of data pins formed on the second planar surface opposite the first planar surface along the edge of the printed circuit board, wherein the printed circuit board comprises a first plurality of traces and a second plurality of traces, wherein the first plurality of traces are configured to communicatively couple each of the first plurality of data pins and each of the second plurality of data pins to the memory controller, and wherein the second plurality of traces are configured to communicatively couple the memory controller to each of the plurality of memory devices.

7. The apparatus of claim 1, wherein, to predict whether the first data block will be requested within the duration threshold, the memory controller is configured to:
determine when a second data block was previously requested; and
determine when the first data block is predicted to be requested relative to the second data block.

8. The apparatus of claim 1, wherein, when the first data block is transferred from the plurality of non-volatile memory devices to the plurality of volatile memory devices, the memory controller is configured to:
determine whether a capacity threshold associated with the plurality of volatile memory devices is reached as a result of storing the first data block, wherein the capacity threshold is set less than a maximum storage capacity of the plurality of volatile memory devices to reduce likelihood of oversubscribing the plurality of volatile memory devices; and
transfer a second data block comprising instructions executable by the processing circuitry to provide a second virtual machine not predicted to be requested within the duration threshold from the plurality of volatile memory devices to the plurality of non-volatile memory devices.

9. The apparatus of claim 1, wherein the plurality of non-volatile memory devices comprises at least one of a flash memory device, a NAND memory device, a phase-change memory device, a 3D XPoint™ memory device, or a ferroelectric random access memory device, or any combination thereof.

10. A method, comprising:
determining that a first data block stored in a non-volatile memory device of a memory module is expected to be requested within a first duration threshold;
in response to determining that the first data block is expected to be requested within the first duration threshold, transferring the first data block from the non-volatile memory device to a volatile memory device of the memory module; and
when the first data block is actually requested within the first duration threshold, outputting the first data block directly from the volatile memory device and bypassing buffer memory implemented in a memory controller.

11. The method of claim 10, comprising:
determining that the first data block is expected to be requested within a second duration threshold set shorter than the first duration threshold used to trigger reading of the data blocks from the volatile memory device; and
storing the first data block in the buffer memory in response to determining that the first data block is expected to be requested within that second duration threshold.

12. The method of claim 11, comprising:
storing a second data block expected to be requested within the first duration threshold from the non-volatile memory device into the volatile memory device; and
storing a third block not expected to be requested within the first duration threshold from the volatile memory device to the non-volatile memory device.

13. The method of claim 10, comprising determining when the first data block is expected to be requested at least in part by analyzing data access parameters associated with the first data block using machine learning techniques.

14. The method of claim 10, comprising:
determining that a capacity threshold associated with the volatile memory device is reached as a result of storing the first data block, wherein the capacity threshold is set less than a maximum storage capacity of the volatile memory device; and
in response to determining that the capacity threshold is reached, transferring a second data block not expected to be requested within the duration threshold from the volatile memory device to the non-volatile memory device.

15. A tangible, non-transitory, computer-readable medium comprising instructions that, when executed by a processor, cause a memory controller comprising a buffer memory to perform operations comprising:
- predicting that a first data block stored in a non-volatile memory device of a memory module is expected to be requested within a first duration threshold;
- in response to predicting that the first data block is expected to be requested within the first duration threshold, transferring the first data block from the non-volatile memory device to the buffer memory; and
- when the first data block is actually requested within the first duration threshold, transmitting the first data block directly from the buffer memory.

16. The computer-readable medium of claim 15, wherein the operations comprise:
- transferring the first data block from the non-volatile memory device to a volatile memory device of the memory module in response to predicting that the first data block is expected to be requested within a second duration threshold equal to a duration of time greater than the first duration threshold; and
- outputting the first data block directly from the volatile memory device while bypassing the buffer memory in response to the first data block being requested within the second duration threshold and outside of the first duration threshold.

17. The computer-readable medium of claim 15, wherein the operations comprise:
- predicting that a second data block is expected to be requested within a second duration threshold set longer than the first duration threshold, wherein the second duration threshold corresponds to a trigger to cause reading of the data blocks from the volatile memory device; and
- storing the second data block in the volatile memory device and the buffer memory based at least in part on the determination.

18. The computer-readable medium of claim 17, wherein the operations comprise:
- storing a second data block expected to be requested within the first duration threshold from the non-volatile memory device into the buffer memory; and
- storing a third block not expected to be requested within the second duration threshold from the volatile memory device to the non-volatile memory device.

19. The computer-readable medium of claim 15, wherein the operations comprise:
- determining when a second data block was previously requested; and
- determining when the first data block is expected to be requested relative to when the second data block was previously requested.

20. The computer-readable medium of claim 15, wherein the operations comprise predicting when the first data block is expected to be requested at least in part by analyzing data access parameters associated with the first data block using machine learning operations.

* * * * *